(12) United States Patent
Zhao

(10) Patent No.: US 11,844,333 B2
(45) Date of Patent: Dec. 19, 2023

(54) BASE FOR PET FEEDER AND PET FEEDER

(71) Applicant: Yihan Kang, Shenzhen (CN)

(72) Inventor: Junhua Zhao, Qingdao (CN)

(73) Assignee: Yihan Kang, Shenzhen (CN)

( * ) Notice: Subject to any disclaimer, the term of this patent is extended or adjusted under 35 U.S.C. 154(b) by 10 days.

(21) Appl. No.: 18/129,367

(22) Filed: Mar. 31, 2023

(65) Prior Publication Data

US 2023/0345906 A1    Nov. 2, 2023

(30) Foreign Application Priority Data

Apr. 2, 2022  (CN) .......................... 202220748710.2

(51) Int. Cl.
*A01K 5/01*    (2006.01)
*A01K 7/02*    (2006.01)

(52) U.S. Cl.
CPC ............ *A01K 5/0114* (2013.01); *A01K 7/027* (2013.01)

(58) Field of Classification Search
CPC ..... A01K 5/0114; A01K 7/027; A01K 5/0128
See application file for complete search history.

(56) References Cited

U.S. PATENT DOCUMENTS

| | | | | |
|---|---|---|---|---|
| 4,658,759 | A  * | 4/1987 | Brown ................. | A01K 5/0114 119/61.5 |
| 4,856,459 | A  * | 8/1989 | Wiseman ............... | A01K 7/027 119/73 |
| D592,814 | S  * | 5/2009 | Uffner ......................... | D30/133 |
| D618,862 | S  * | 6/2010 | Shamoon ..................... | D30/129 |
| 7,735,455 | B2 * | 6/2010 | Clark, Jr. ............... | A01K 7/027 119/73 |
| 9,288,967 | B1 * | 3/2016 | Wampler ................. | A01K 7/00 |
| D962,558 | S  * | 8/2022 | Yang ........................... | D30/131 |
| 2016/0242385 | A1 * | 8/2016 | Parness .................. | F16M 11/38 |

FOREIGN PATENT DOCUMENTS

EP    2818043 A2 * 12/2014  ........... A01K 5/0114

* cited by examiner

*Primary Examiner* — Ebony E Evans
(74) *Attorney, Agent, or Firm* — Daniel M. Cohn; Howard M. Cohn

(57) ABSTRACT

A base for pet feeder and a pet feeder for eating or drinking of pets are provided. The base includes a main body portion and a plurality of adjusting mechanisms. The main body portion includes a first side and a second side, the second side is disposed opposite to the first side, and the first side is configured to contain food or water. The plurality of the adjusting mechanisms are disposed at the second side of the main body portion at intervals, each of the plurality of the adjusting mechanisms is capable of providing at least three heights. Each of the plurality of the adjusting mechanisms includes a first supporting plate and a second supporting plate. The first supporting plate includes a first part and a second part, the first part is rotatably connected to the second side.

14 Claims, 8 Drawing Sheets

BASE FOR PET FEEDER AND PET FEEDER

TECHNICAL FIELD

The present disclosure relates to a technical field of animal supplies, and in particular to a base for pet feeder and a pet feeder for eating or drinking of pets.

BACKGROUND

Pet feeders are containers specifically for people to feed animals, such as pets, and are capable of providing food and water for the pets. Current pet feeders are fixed in height, which are inconvenient for adjusting heights of food containers according to different heights of the pets and are also not conductive to eating and drinking of the pets.

Therefore, it is necessary to provide a pet feeder in the present disclosure for solving above technical problems.

SUMMARY

The present disclosure provides a base for pet feeder and a pet feeder for eating or drinking of pets, the base for pet feeder is capable of providing at least three heights to be adjusted, which is suitable for eating and drinking of pets having different heights.

Embodiments of the present disclosure provide a base for pet feeder, including a main body portion and a plurality of adjusting mechanisms. The main body portion includes a first side and a second side, the second side is disposed opposite to the first side, and the first side is configured to contain food or water. The plurality of the adjusting mechanisms are disposed at the second side of the main body portion at intervals, each of the plurality of the adjusting mechanisms is capable of providing at least three heights. Each of the plurality of the adjusting mechanisms includes a first supporting plate and a second supporting plate. The first supporting plate includes a first part and a second part, the first part is rotatably connected to the second side, so as to fold or unfold the first supporting plate with respect to the second side. The second supporting plate is movably connected to the second part, and the second supporting plate is capable of being at different heights with respect to the first supporting plate.

Furthermore, the second supporting plate is rotatably connected to the second part, so as to fold or unfold the second supporting plate with respect to the first supporting plate.

Furthermore, the main body portion further includes a plurality of mounting portions, the plurality of the mounting portions are disposed on the second side, one of the plurality of the adjusting mechanisms is disposed on a respective one of the plurality of the mounting portions. Each of the plurality of the mounting portions includes two limiting plates, the two limiting plates are oppositely disposed, and the first supporting plate is rotatably connected between the two limiting plates. A first limiting protrusion is protruded from one side of at least one of the two limiting plates toward another one of the two limiting plates, when the first supporting plate is folded with respect to the second side, the first limiting protrusion is capable of abutting against one surface of the first supporting plate distal from the second side, so as to limit the first supporting plate.

Furthermore, a second limiting protrusion is protruded from the one side of the at least one of the two limiting plates toward the another one of the two limiting plates, when the first supporting plate is unfolded with respect to the second side, the first supporting plate includes a side edge facing the second limiting protrusion, and the second limiting protrusion abuts against the side edge, so as to limit the first supporting plate.

Furthermore, the main body portion includes a base plate and a surrounding portion, the surrounding portion is disposed around a periphery of the base plate, the surrounding portion and the base plate oppositely define a first groove and a second groove, and the first groove is configured to contain the food and the water. Each of the two limiting plates is disposed in the second groove, and an end surface of each of the two limiting plates distal from the base plate does not exceed an end surface of the surrounding portion distal from the base plate.

Furthermore, when the first supporting plate is folded with respect to the base plate, an end surface of the first supporting plate distal from the base plate does not exceed the end surface of the surrounding portion distal from the base plate.

Furthermore, the first supporting plate further includes a first supporting sloping edge, and the first supporting sloping edge is disposed at an edge of the second part distal from the first part. When the first supporting plate is folded with respect to the second side, the first supporting sloping edge is slopingly disposed from the second part toward a direction distal from both the first part and the first side.

Furthermore, the second supporting plate includes a straight portion and a second supporting sloping edge, a first end of the straight portion is connected to the first supporting plate, and a second end of the straight portion is connected to the second supporting sloping edge. When the first supporting plate is unfolded with respect to the second supporting plate, a sloping direction of the second supporting sloping edge is the same as a sloping direction of the first supporting plate.

Furthermore, an accommodation groove is defined in the first supporting plate, when the second supporting plate is folded with respect to the first supporting plate, the second supporting plate is accommodated in the accommodation groove.

Furthermore, the second supporting plate is slidably connected to the first supporting plate, and the second supporting plate is capable of being limited at different positions of the first supporting plate.

Furthermore, the second part is of a hollow structure and is sleeved on the second supporting plate, one end of the second supporting plate is capable of sliding along a length direction of the second part within the second part.

Furthermore, a plurality of positioning holes are defined on the second part along the length direction of the second part, an elastic positioning column is disposed on the first supporting plate, and the elastic positioning column is capable of being limited to any one of the plurality of the positioning holes.

Furthermore, the base for the pet feeder further includes a heater, the heater is disposed at the second side, and the heater is configured to heat the food or the water in the first side.

The embodiments of the present disclosure further provide a pet feeder for eating of the pets, including the base in the foregoing and a storage device. The storage device is disposed at the first side of the main body portion of the base, and the storage device is configured to store the food.

The embodiments of the present disclosure further provide a pet feeder for drinking of the pets, including the base in the foregoing and a storage device. The storage device is disposed at the first side of the main body portion of the base, and the storage device is configured to store the water.

In the embodiments of the present disclosure, the base for the pet feeder includes the main body portion and the plurality of the adjusting mechanisms, the first side of the main body portion is configured to contain the food or the water, and the plurality of the adjusting mechanisms connected to the second side of the main body portion are capable of providing at least three heights, thereby enabling the main body portion to have at least three heights, which is suitable for pets having different heights to eat or drink. In this way, there may be not the situation that a height where the food and the water are placed is not suitable for the pets to eat or drink to cause that the pets cannot successfully eat or drink. Moreover, each of the plurality of the adjusting mechanisms includes the first supporting plate and the second supporting plate, the first supporting plate is capable of being folded or unfolded with respect to the second side of the main body portion, the second supporting plate is movably connected to the first supporting plate, and the second supporting plate is capable of being at different heights with respect to the first supporting plate, which may conveniently and quickly change a height of each of the plurality of the adjusting mechanisms, is simple in structure, is reliable, and is further convenient for operating.

BRIEF DESCRIPTION OF DRAWINGS

In order to more clearly illustrate technical solutions in embodiments of the present disclosure, drawings that need to be used in description of the embodiments are briefly described below, and it is obvious that the drawings in the following description are merely some embodiments of the present disclosure, and those skilled in the art may obtain other drawings according to these drawings without involving any inventive effort.

For a more complete understanding of the present disclosure and the beneficial effects thereof, the following description may be made below in conjunction with the accompanying drawings, in which same reference numerals refer to same parts in the following description.

Figure 1:
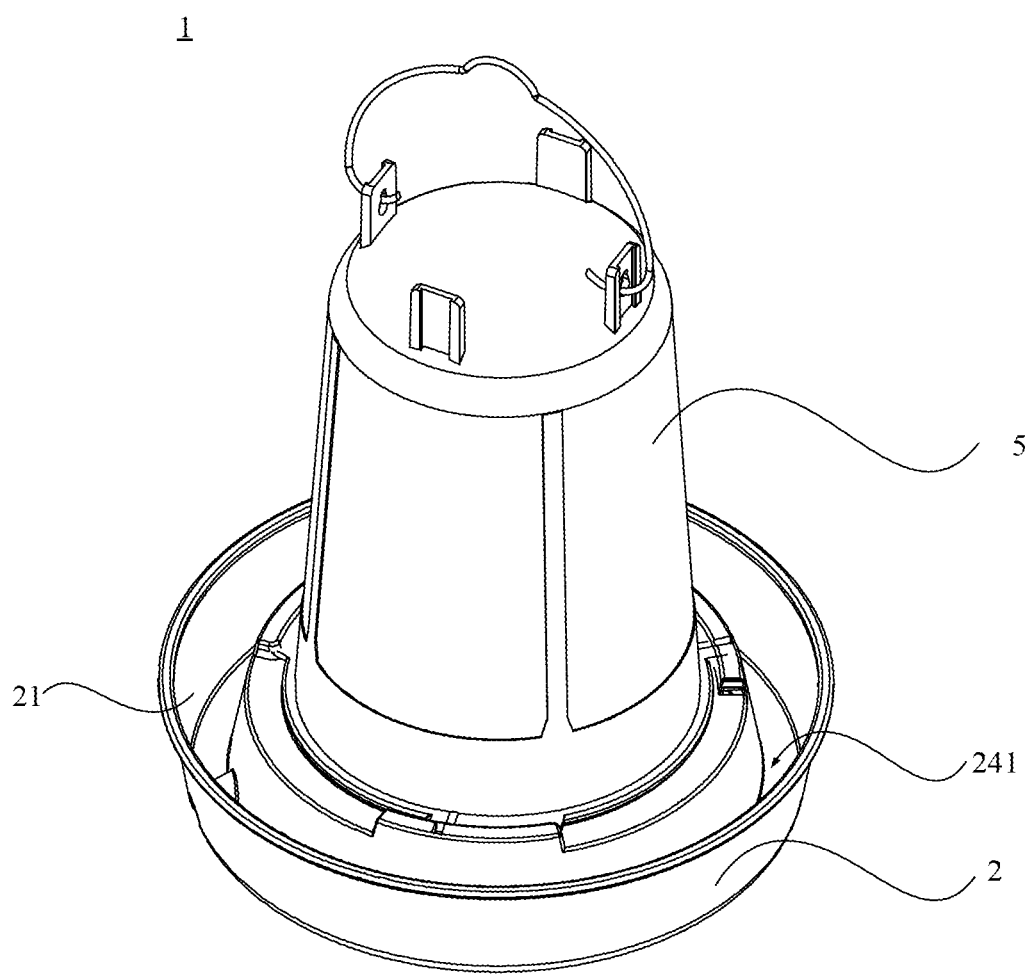
FIG. 1 is a structural schematic diagram of a pet feeder for drinking of pets according to one embodiment of the present disclosure.

Reference numerals in the drawings: 1. pet feeder for drinking of pets; 2. base; 20. main body portion; 21. first side; 22. base plate; 23. second side; 24. surrounding portion; 241. first groove; 243. second groove; 26. mounting portions; 260. limiting plate; 262. first limiting protrusion; 264. second limiting protrusion; 30. adjusting mechanism; 32. first supporting plate; 321. accommodation groove; 322. first part; 324. second part; 325. positioning hole; 326. first supporting sloping edge; 327. side edge; 328. protruding block; 34. second supporting plate; 342. straight portion; 344. second supporting sloping edge; 46. elastic positioning column; 40. heater; 5. storage device; and 6. pet feeder for eating of the pets.

DETAILED DESCRIPTION

Technical solutions in embodiments of the present disclosure are clearly and completely described below with reference to accompanying drawings in the embodiments of the present disclosure. Obviously, the described embodiments are only a part of the embodiments of the present disclosure, but are not all embodiments. All other embodiments obtained by a person skilled in the art based on the embodiments of the present disclosure without creative efforts shall fall within protection scopes of the present disclosure.

Figure 2:
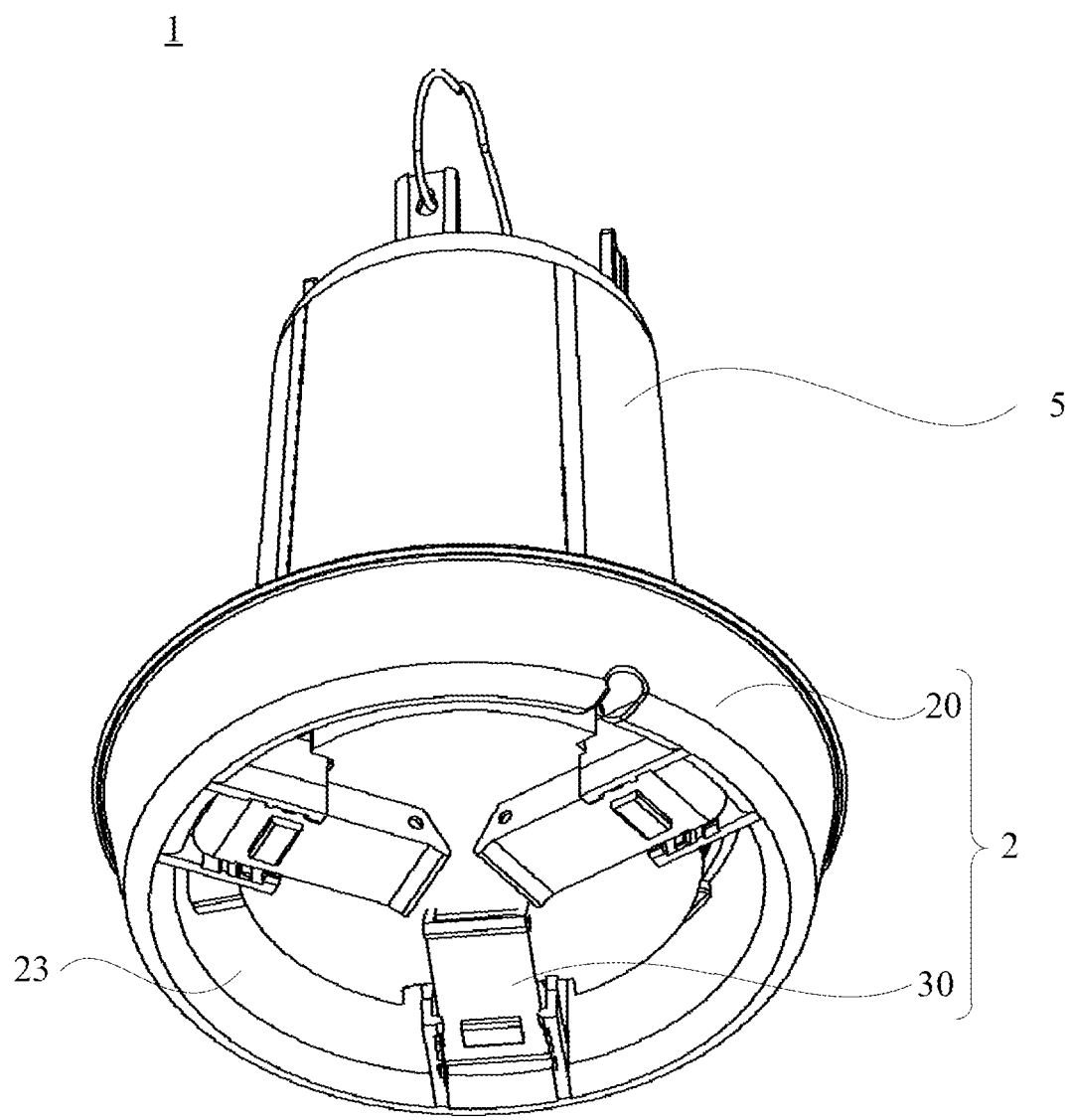
FIG. 2 is a structural schematic diagram of another representation angle of the pet feeder for drinking of the pets shown in FIG. 1.

The embodiments of the present disclosure provide a base, applied to a pet feeder for eating or drinking of pets, and is described below with a pet feeder for drinking of the pets as an example. As shown in FIGS. 1 and 2, FIG. 1 is a structural schematic diagram of the pet feeder for drinking of the pets according to one embodiment of the present disclosure, and FIG. 2 is a structural schematic diagram of another representation angle of the pet feeder for drinking of the pets shown in FIG. 1. The base 2 includes including a main body portion 20 and a plurality of adjusting mechanisms 30. The main body portion 20 includes a first side 21 and a second side 23, the second side 23 is disposed opposite to the first side 21, and the first side 21 is configured to contain food or water. The plurality of the adjusting mechanisms 30 are disposed at the second side 23 of the main body portion 20 at intervals, each of the plurality of the adjusting mechanisms 30 is capable of providing at least three heights.

Figure 3:
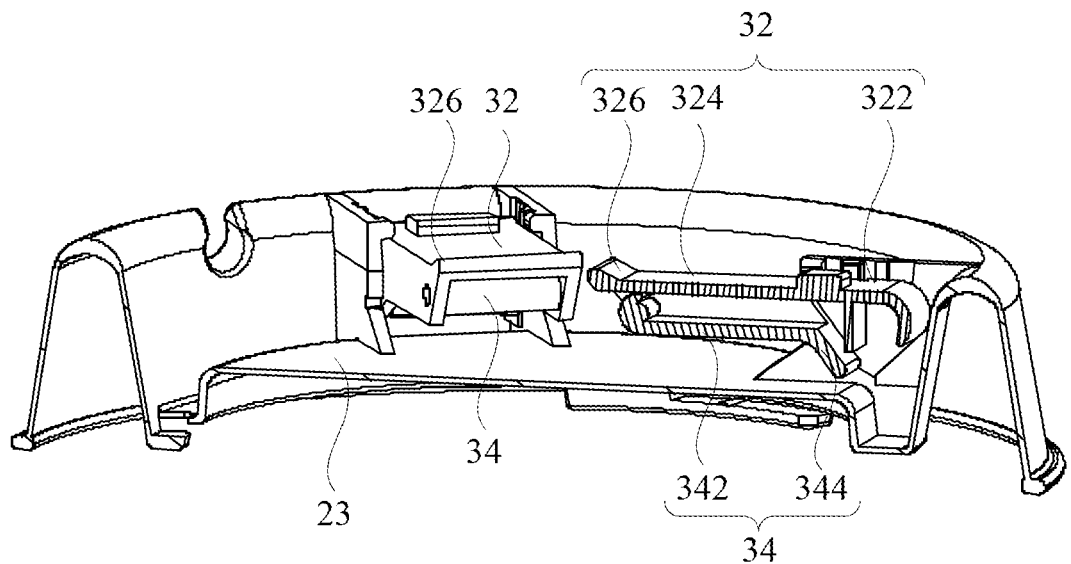
FIG. 3 is a cross-sectional schematic diagram of a base for the pet feeder for drinking of the pets shown in FIG. 1.

Please further refer to FIG. 3, FIG. 3 is a cross-sectional schematic diagram of a base for the pet feeder for drinking of the pets shown in FIG. 1. Each of the plurality of the adjusting mechanisms 30 includes a first supporting plate 32 and a second supporting plate 34. The first supporting plate 32 includes a first part 322 and a second part 324, the first part 322 is rotatably connected to the second side 324, so as to fold or unfold the first supporting plate 32 with respect to the second side 23. The second supporting plate 34 is movably connected to the second part 324, and the second supporting plate 34 is capable of being at different heights with respect to the first supporting plate 32.

The plurality of the adjusting mechanisms 30 connected to the second side 23 of the main body portion 20 are capable of providing at least three heights, thereby enabling the main body portion 20 to have at least three heights, which is suitable for pets having different heights to eat or drink. In this way, there may be not the situation that a height where the food and the water are placed is not suitable for the pets to eat or drink to cause that the pets cannot successfully eat or drink. Moreover, each of the plurality of the adjusting mechanisms 30 includes the first supporting plate 32 and the second supporting plate 34, the first supporting plate 32 is capable of being folded or unfolded with respect to the second side 23 of the main body portion 20, the second supporting plate 34 is movably connected to the first supporting plate 32, and the second supporting plate 34 is capable of being at different heights with respect to the first supporting plate 32, which may conveniently and quickly change a height of each of the plurality of the adjusting mechanisms 30, is simple in structure, is reliable, and is further convenient for operating.

In some embodiments, the second supporting plate 34 is rotatably connected to the second part 324, so as to fold or unfold the second supporting plate 34 with respect to the first supporting plate 32.

Figure 4:
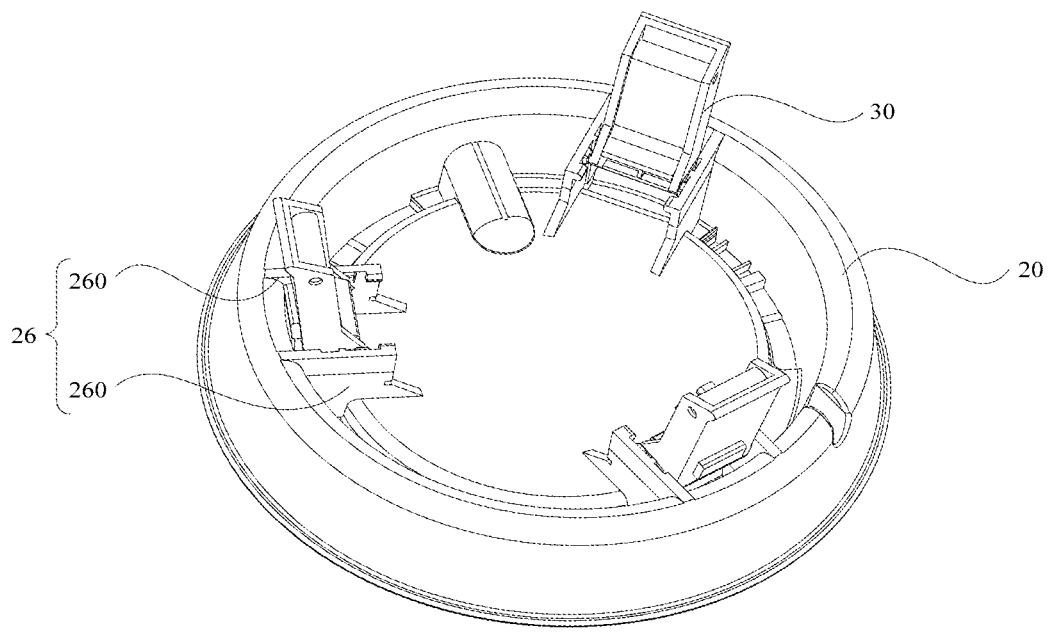
FIG. 4 is a structural schematic diagram of the base for the pet feeder for drinking of the pets according to one embodiment of the present disclosure.

When the first supporting plate 32 is folded with respect to the second side 23, it may be understood that the first supporting plate 32 is flatly laid on the second side 23 and perpendicular to the second side 23, and at this time, a first height of the first supporting plate 32 is small. Please further refer to FIG. 4, FIG. 4 is a structural schematic diagram of the base for the pet feeder for drinking of the pets according to one embodiment of the present disclosure. When the first supporting plate 32 is unfolded with respect to the second side 23, it can be understood that the first supporting plate 32 extends from the second side 23 in a direction distal from the second side 23, and is perpendicular to the second side 23, at this time, a second height of the first supporting plate 32 is large, and the second height is far greater than the first height.

Figure 5:
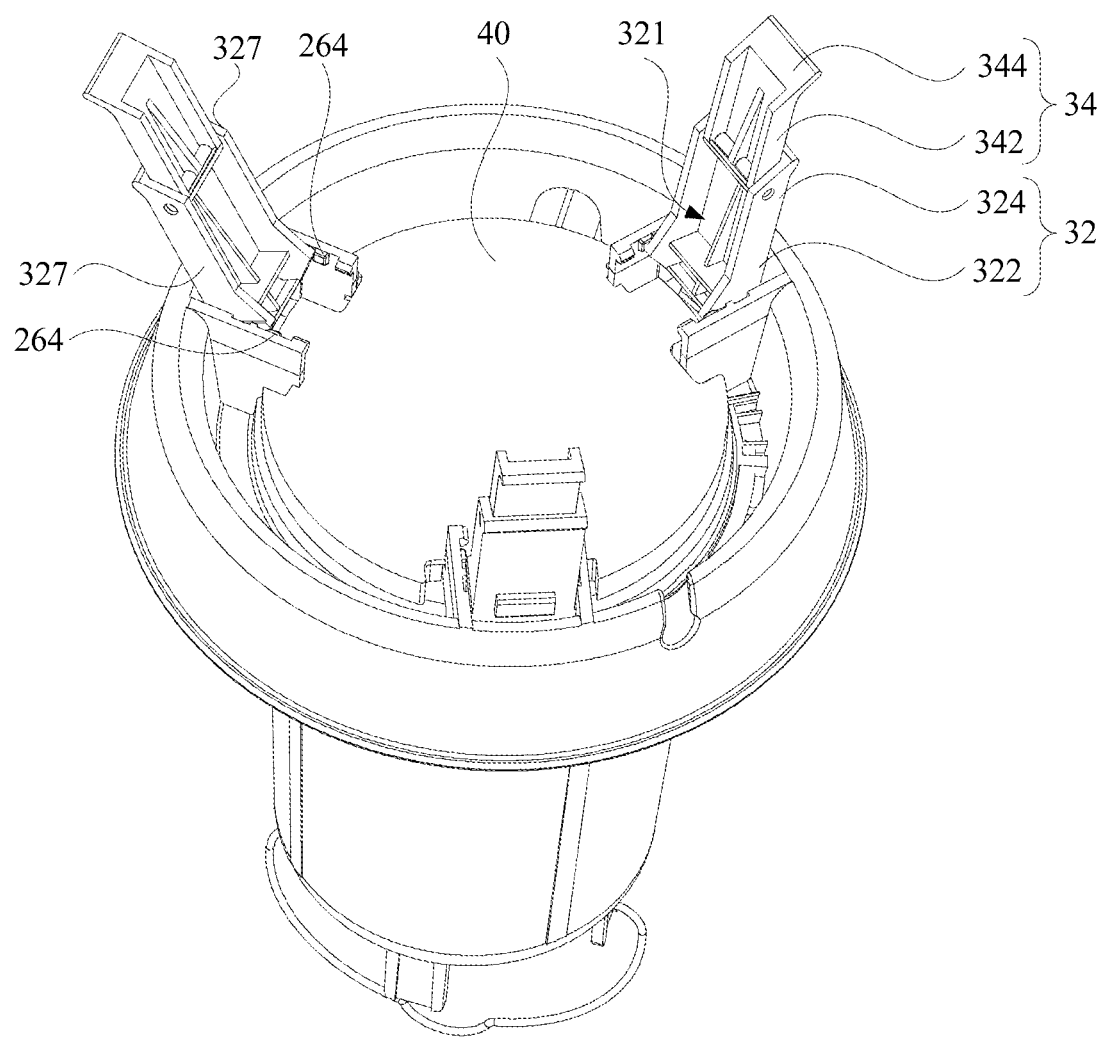
FIG. 5 is a structural schematic diagram of unfolded states of a first supporting plate and a second supporting plate of the pet feeder for drinking of the pets shown in FIG. 1.

When the second supporting plate 34 is folded with respect to the first side 21, it can be understood that the second supporting plate 34 and the first supporting plate 32 are generally parallel or both laid on the second side 23 and perpendicular to the second side 23, and at this time, a third height of the second supporting plate 34 is small. Please further refer to FIG. 5, FIG. 5 is a structural schematic diagram of unfolded states of the first supporting plate and the second supporting plate of the pet feeder for drinking of the pets shown in FIG. 1. When the second supporting plate 34 is unfolded with respect to the first side 21, it can be understood that the second supporting plate 34 extends from the first supporting plate 32 in a direction distal from the second side 23, and is perpendicular to the second side 23, at this time, a fourth height of the second supporting plate 34 is large, and the fourth height is far greater than the third height.

Therefore, when the second supporting plate 34 is folded with respect to the first supporting plate 32, and the first supporting plate 32 is folded with respect to the second side 23, the plurality of the adjusting mechanisms 30 is are a fully folded state, and at this time, a height of each of the plurality of the adjusting mechanisms 30 is minimum, that is, a height of the base 2 is minimum. When the second supporting plate 34 is folded with respect to the first supporting plate 32, and the first supporting plate 32 is unfolded with respect to the second side 23, the plurality of the adjusting mechanisms are in a semi-folded state, and at this time, the height of each of the plurality of the adjusting mechanisms 30 is in a middle, that is, the height of the base 2 is in a middle. When the second supporting plate 34 is unfolded with respect to the first supporting plate 32, and the first supporting plate 32 is unfolded with respect to the second side 23, the plurality of the adjusting mechanisms 30 are in an unfolded state, and at this time, the height of each of the plurality of the adjusting mechanisms 30 is the largest, that is, the height of the base 2 is the largest.

A quantity of the plurality of the adjusting mechanisms 30 may beset according to needs, such as three, four, or more. In some embodiments, the plurality of the adjusting mechanisms 30 may be uniformly disposed around a central position of the second side 23. For example, the second side 23 may be circular, and the plurality of the adjusting mechanisms 30 may be uniformly disposed around a center of the second side 23. In some embodiments, the plurality of the adjusting mechanisms 30 may also be non-uniformly disposed. For example, the second side 23 may be square, there may be three adjusting mechanisms 30 provided, and one of the three adjusting mechanisms 30 and the other two of the three adjusting mechanisms 30 are located on two opposite sides of the second side 23.

In some embodiments, the main body portion 20 further includes a plurality of mounting portions 26, the plurality of the mounting portions 26 are disposed on the second side 23, one of the plurality of the adjusting mechanisms 30 is disposed on a respective one of the plurality of the mounting portions 26. Each of the plurality of the mounting portions 26 includes two limiting plates 260, the two limiting plates 260 are oppositely disposed, and the first supporting plate 32 is rotatably connected between the two limiting plate 260.

Figure 6:
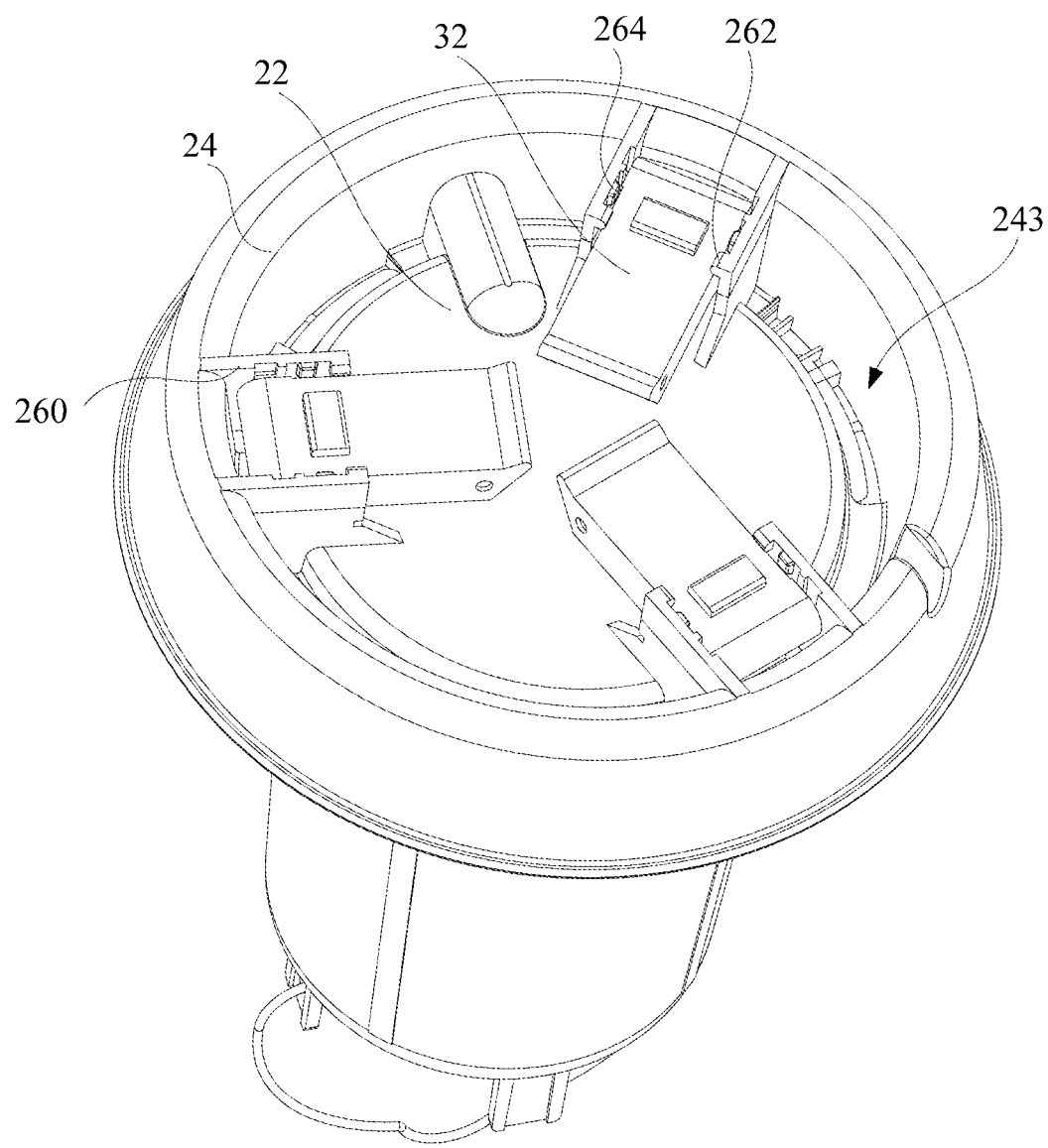
FIG. 6 is a structural schematic diagram of another representation angle of the pet feeder for drinking of the pets shown in FIG. 1.

Please further refer to FIG. 6, FIG. 6 is a structural schematic diagram of another representation angle of the pet feeder for drinking of the pets shown in FIG. 1. A first limiting protrusion 262 is protruded from one side of at least one of the two limiting plates 260 toward another one of the two limiting plates 260, when the first supporting plate 32 is folded with respect to the second side 23, the first limiting protrusion 262 is capable of abutting against one surface of the first supporting plate 32 distal from the second side 23, so as to limit the first supporting plate 32. It can be understood that when the first supporting plate 32 is flatly laid on the second side 23, the first limiting protrusion 262 is clamped on the one surface of the first supporting plate 32 distal from the second side 23, so that the first supporting plate 32 is limited in a current state, that is, the first supporting plate 32 is limited to be flatly laid on the second side 23.

It should be noted that when the second supporting plate 34 is capable of being folded on the first supporting plate 32, a current height of each of the plurality of the adjusting mechanisms 3 is the smallest. When the height of each of the plurality of the adjusting mechanisms 30 needs to be adjusted, only the first supporting plate 32 needs to be separated from the first limiting protrusion 262 by force. The first limiting protrusion 262 has a certain elasticity, or the two limiting plates 260, each having the first limiting protrusion 262, have a certain elasticity, which is convenient for the first supporting plate 32 to move from between the first limiting protrusion 262 and the second side 23 to a side of the first limiting protrusion 262 distal from the second side 23.

In some embodiments, when the first supporting plate 32 is disposed between the first limiting protrusion 262 and the second side 23, the first limiting protrusion 262 is capable of abutting against the one surface of the first supporting plate 32 distal from the second side 23, thereby limiting the first supporting plate 32 between the first limiting protrusion 262 and the second side 23. At this time, the first supporting plate 32 is rotated in a direction distal from the second side 23, and the first supporting plate 32 extrudes the first limiting protrusion 262 outwards, since the first limiting protrusion 262 has the certain elasticity, or the two limiting plates 260, each having the first limiting protrusion 262, have the certain elasticity. The first limiting protrusion 262 may be deformed in a direction distal from the first supporting plate 32, and the first supporting plate 32 may continue to rotate until moving to the side of the first limiting protrusion 262 distal from the second side 23.

In some embodiments, when the first supporting plate 32 is disposed on the side of the first limiting protrusion 262 distal from the second side 23, the first supporting plate 32 is rotated toward the second side 23, and the first supporting plate 32 extrudes the first limiting protrusion 262 outwards, since the first limiting protrusion 262 has the certain elasticity, or the two limiting plates 260, each having the first limiting protrusion 262, have the certain elasticity, the first limiting protrusion 262 may be elastically deformed in a direction distal from the first supporting plate 32, and the first supporting plate 32 may continue to rotate until moving to between the first limiting protrusion 262 and the second side 23. At this time, the first supporting plate 32 no longer extrudes the first limiting protrusion 262, and the first limiting protrusion 262 may restore an original state, that is, the first limiting protrusion 262 may abut against the one surface of the first supporting plate 32 distal from the second side 23 to limit the first supporting plate 32.

In some embodiments, the first limiting protrusion 262 is disposed on each of the two limiting plates 260. In some other embodiments, the first limiting protrusion 262 is disposed on only one of the two limiting plates 260 in each of the plurality of the mounting portions 26.

In some embodiments, a second limiting protrusion 264 is protruded from the one side of the at least one of the two limiting plates 260 toward the another one of the two limiting plates 260, when the first supporting plate 32 is unfolded with respect to the second side 23, the first supporting plate 32 includes a side edge facing the second limiting protrusion 264, and the second limiting protrusion 264 abuts against the side edge, so as to limit the first supporting plate 32.

After the first supporting plate 32 is disposed on the side of the first limiting protrusion 262 distal from the second side 23, the side edge of the first supporting plate 32 may also abut against the second limiting protrusion 264, so as to limit the first supporting plate 32 in a state where the first supporting plate 32 is unfolded with respect to the second side 23.

Figure 7:
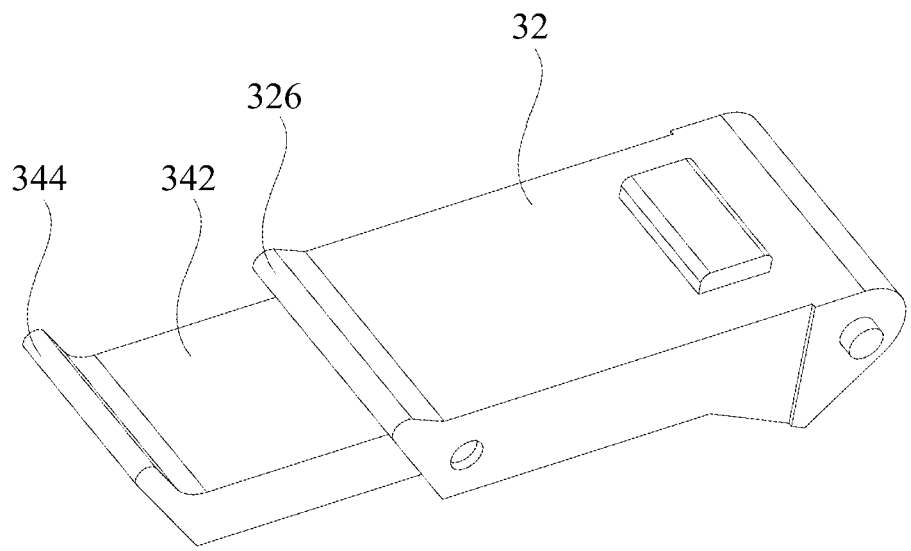
FIG. 7 is a structural schematic diagram of the first supporting plate and the second supporting plate of the base for the pet feeder for drinking of the pets according to one embodiment of the present disclosure.
Figure 8:
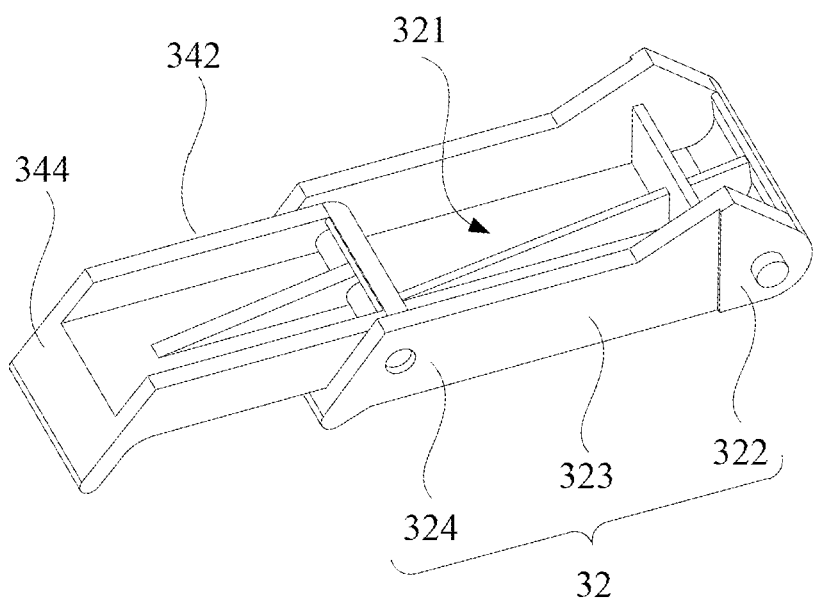
FIG. 8 is a structural schematic diagram of another representation angle of the first supporting plate and the second supporting plate shown in FIG. 7.

In some embodiments, please refer to FIGS. 7 and 8, FIG. 7 is a structural schematic diagram of the first supporting plate and the second supporting plate of the base for the pet feeder for drinking of the pets according to one embodiment of the present disclosure, and FIG. 8 is a structural schematic diagram of another representation angle of the first supporting plate and the second supporting plate shown in FIG. 7. The first supporting plate 32 may further include a middle part 323 located between the first part 322 and the second part 324, the first part 322 is rotatably connected to the plurality of the mounting portions 26 and along a direction of a rotation axis of the first part 322, and a thickness of the middle part 323 is less than a thickness of the first part 322. When the first supporting plate 32 is folded with respect to the second side 23, the second limiting protrusion 264 is disposed opposite to the middle part 323, and a gap is defined between the second limiting protrusion 264 and the middle part 323. When the first supporting plate 32 is rotated to a proper position, the second limiting protrusion 264 is disposed opposite to the first part 322, and the second limiting protrusion 264 and the first part 322 may be in interference fit, so that the first supporting plate 32 is limited in the unfolded state and the plurality of the adjusting mechanisms 30 are stably maintained in a current state.

It should be noted that, in some embodiments, the second limiting protrusion 264 is disposed on each of the two limiting plates 260. In some other embodiments, the second limiting protrusion 264 is disposed on only one of the two limiting plates 260 in each of the plurality of the mounting portions 26.

In some embodiments, a first reinforcing rib is disposed on a side of the first supporting plate 32 facing the second side 23, the first reinforcing rib may be disposed along a length direction of the first supporting plate 32, certainly, the first reinforcing rib may also be disposed long a width direction of the first supporting plate 32. A second reinforcing rib is disposed on a side of the second supporting plate 34 facing the second side 23, the second reinforcing rib may be disposed along a length direction of the second supporting plate 34, certainly, the second reinforcing rib may also be disposed along a width direction of the second supporting plate 34.

In some embodiments, the first supporting plate 32 further includes a first supporting sloping edge 326, and the first supporting sloping edge 326 is disposed at an edge of the second part 324 distal from the first part 322. When the first supporting plate 32 is folded with respect to the second side 23, the first supporting sloping edge 326 is slopingly disposed from the second part 324 toward a direction distal from both the first part 322 and the first side 21. When the first supporting plate 32 abuts against a placement surface, such as the ground, through the first supporting sloping edge 326, the first supporting plate 32 may be more stably placed on the placement surface through the first supporting sloping edge 326, so as to enable the base 2 to be more stably placed and is not easy to topple.

In some embodiments, an end surface of the first supporting sloping edge 326 distal from the second part 324 may have a larger contact surface, and the contact surface is configured to be in contact with the placement surface, thereby providing a larger contact area for contacting the placement surface, and further allowing the base 2 to be more stably placed on the placement surface.

In some embodiments, the second supporting plate 34 includes a straight portion 342 and a second supporting sloping edge 344, a first end of the straight portion 342 is connected to the first supporting plate 32, and a second end of the straight portion 342 is connected to the second supporting sloping edge 344. When the first supporting plate 32 is unfolded with respect to the second supporting plate 34, a sloping direction of the second supporting sloping edge 344 is the same as a sloping direction of the first supporting plate 32.

When the second supporting plate 34 abuts against a placement surface, such as the ground, through the second supporting sloping edge 344, the second supporting plate 34 may be more stably placed on the placement surface through the second supporting sloping edge 344, so as to enable the base 2 to be more stably placed and is not easy to topple.

In some embodiments, an end surface of the second supporting sloping edge 344 distal from the second part 324 may have a larger contact surface, and the contact surface is configured to be in contact with the placement surface, thereby providing a larger contact area for contacting the placement surface, and further allowing the base 2 to be more stably placed on the placement surface.

In some embodiments, an accommodation groove 321 is defined in the first supporting plate 32, when the second supporting plate 34 is folded with respect to the first supporting plate 32, the second supporting plate 34 is accommodated in the accommodation groove 321.

When the second supporting plate 34 is not required, the second supporting plate 34 is accommodated in the accommodation groove 321, and the second supporting plate 34 may be better hidden. In some embodiments, when the first supporting plate 32 is folded with respect to the second side 23, the side of the first supporting plate 32 facing the second side 23 is provided with the accommodation groove 321, and at this time, the second supporting plate 34 is disposed between the first supporting plate 32 and the second side 23, so as to better accommodate and hide the second supporting plate 34. Meanwhile, the first supporting plate 32 cooperates with the second side 23 to well limit the second supporting plate 34.

In some embodiments, please further refer to FIGS. 1 and 6, the main body portion 20 includes a base plate 22 and a surrounding portion 24, the surrounding portion 24 is disposed around a periphery of the base plate 22, the surrounding portion 24 and the base plate 22 oppositely define a first groove 241 and a second groove 243, and the first groove 241 is configured to contain the food and the water. Each of the two limiting plates 260 is disposed in the second groove 243, and an end surface of each of the two limiting plates 260 distal from the base plate 22 does not exceed an end surface of the surrounding portion 24 distal from the base plate 22.

A thickness of the surrounding portion 24 may be greater than a thickness of the base plate 22, so that the surrounding portion 24 and the base plate 22 form the first groove 241 and the second groove 243 which are oppositely disposed, and the first groove 241 is configured to contain the food or the water, which is convenient for the pets to eat and drink. The two limiting plates 260 are disposed in the second groove 243, and the end surface of each of the two limiting plates 260 distal from the base plate 22 does not exceed the end surface of the surrounding portion 24 distal from the base plate 22, and when the first supporting plate 32 is folded with respect to the second side 23, the base 2 abuts against the placement surface through the end surface of the surrounding portion 24 distal from the base plate 22, so that a larger contact surface may be provided, which is more stable in placing the base 2.

In some embodiments, the end surface of each of the two limiting plates 260 distal from the base plate 22 may be flush with the end surface of the surrounding portion 24 distal from the base plate 22, and the base 2 abuts against the placement surface through the end surfaces of the surrounding portion 24 and each of the two limiting plates 260 distal from the base plate 22, thereby providing a larger contact surface and more stably placing the base 2.

In some embodiments, when the first supporting plate 32 is folded with respect to the base plate 22, an end surface of the first supporting plate 32 distal from the base plate 22 does not exceed the end surface of the surrounding portion 24 distal from the base plate 22.

When the first supporting plate 32 is folded with respect to the base plate 22, the end surface of the first supporting plate 32 distal from the base plate 22 does not exceed the end surface of the surrounding portion 24 distal from the base plate 22. At this time, the first supporting plate 32 does not affect stable placement of the surrounding portion 24, and the base 2 abuts against the placement surface through the end surface of the surrounding portion 24 distal from the base plate 22, so that a larger contact surface may be provided, and the base 2 is more stably placed.

In some embodiments, when the first supporting plate 32 is folded with respect to the base plate 22, a protruding block 328 is disposed on the side of the first supporting plate 32 distal from the base plate 22, the protruding block 328 is capable of abutting against the placement surface, so that there is not only the surrounding portion 24 capable of supporting the base 2, but also the protruding block 328 capable of supporting the base 2 in a middle of the surrounding portion 24. Since more than one of the first supporting plate 32 is disposed on the base 2, more than one of the protruding block 328 is capable of cooperating with the surrounding portion 24 for better supporting the base 2.

In some embodiments, the protruding block 3288 rotates and limits the first supporting plate 32 to prevent a rotation angle of the first supporting plate 32 from being too large.

In some embodiments, the base 2 further includes a heater 40, the heater 40 is disposed at the second side 23, and the heater 40 is configured to heat the food or the water in the first side 21. For example, in a relatively cold day, the heater 40 is capable of proving relatively hot food or water for animals, thereby ensuring health of the animals.

In some embodiments, when the first supporting plate 32 is unfolded with respect to the second side 23, an angle between the first supporting plate 32 and the base plate 22 is an obtuse angle, and when the second supporting plate 34 is unfolded with respect to the first supporting plate 32, an angle between the second supporting plate 34 and the first supporting plate 32 is an obtuse angle, so that the first supporting plate 32 and the second supporting plate 34 rotate outwards all the time when supporting the base 2 and the base 2 can be more stably placed on the placement surface, such as the ground.

Figure 9:
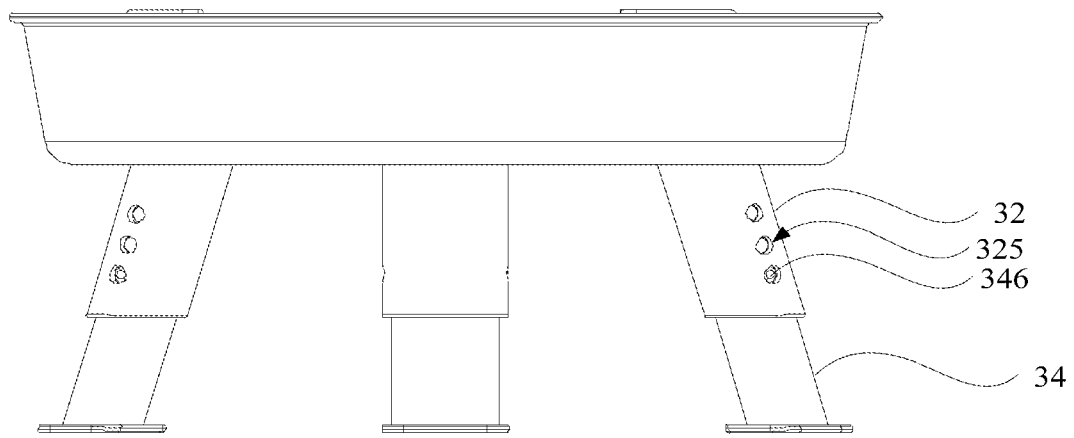
FIG. 9 is a structural schematic diagram of another representation angle of the base for the pet feeder for drinking of the pets according to one embodiment of the present disclosure.

The first supporting plate 32 and the second supporting plate 34 may also be connected through other structure, and in some embodiments, please further refer to FIG. 9, FIG. 9 is a structural schematic diagram of another representation angle of the base for the pet feeder for drinking of the pets according to one embodiment of the present disclosure. The second supporting plate 34 is slidably connected to the first supporting plate 32, and the second supporting plate 34 is capable of being limited at different positions of the first supporting plate 32, therefore providing different heights of the second supporting plate 34 and the first supporting plate 32.

In some embodiments, the second part 324 is of a hollow structure and is sleeved on the second supporting plate 34, one end of the second supporting plate 34 is capable of sliding along a length direction of the second part 324 within the second part 324. When the second supporting plate 34 slides in the second part 324 of the first supporting plate 32, the second supporting plate 34 is limited to locate at different positions, so that the first supporting plate 32 and the second supporting plate 34 have different heights.

In some embodiments, a plurality of positioning holes 325 are defined on the second part 324 along the length direction of the second part 324, an elastic positioning column 346 is disposed on the first supporting plate 34, and the elastic positioning column 346 is capable of being limited to any one of the plurality of the positioning holes 325. The elastic positioning column 346 is cooperated with the plurality of the positioning holes 325, so that the second supporting plate 34 is limited at different heights of the first supporting plate 32 to enable the first supporting plate 32 and the second supporting plate 34 to have different heights. Cooperating the elastic positioning column 346 with any one of the plurality of the positioning holes 325 is convenient in operation and may conveniently provide various heights.

It should be understood that a quantity of the plurality of the positioning holes 325 disposed along a length direction of the second part 324 is defined as a first quantity, and the second supporting plate 34 may provide heights of the first quantity. For example, there are three positioning holes, the second supporting plate 34 may provide three heights with respect to the first supporting plate 32, and in combination with two heights of the first supporting plate 32 with respect to the main body portion 20, considering that one height of the second supporting plate 34 with respect to the first supporting plate 32 is a default height, and the plurality of the adjusting mechanisms 30 each may provide four heights in total.

In some embodiments, the second supporting plate includes a first connecting portion rotatably connected to the first supporting plate and a second connecting portion disposed opposite to a rotating portion. The base may further include a third supporting plate, and the third supporting plate may be rotatably connected to the second connecting portion of the second supporting plate, so that the third supporting plate may be folded or unfolded with respect to the second supporting plate. A connection structure of the third supporting plate and the second supporting plate is similar to a connection structure of the second supporting plate and the first supporting plate, and details are not described herein again. Each of the plurality of the adjusting mechanisms may provide four heights through the first supporting plate, the second supporting plate, and the third supporting plate.

It can be understood that the base may further provide a structure having other heights. For example, the second supporting plate includes a first connecting portion rotatably connected to the first supporting plate and a second connecting portion disposed opposite to a rotation portion, the base may further include a third supporting plate, the third supporting plate is slidably connected to the second connecting portion of the second supporting plate, and a plurality of positioning holes may be defined on the second supporting plate along a length direction of the second supporting plate, an elastic positioning column is disposed on the third supporting plate, the third supporting plate may be disposed in any one of the plurality of the positioning holes in the second supporting plate through the elastic positioning column, the elastic positioning column of the third supporting plate is disposed in different positioning holes, to enable each of the plurality of the adjusting mechanisms to have different heights, and the plurality of the adjusting mechanisms each is capable of providing more than three heights in combination with the first supporting plate and the second supporting plate. For example, three positioning holes are defined on the second supporting plate, and the plurality of the adjusting mechanisms each is capable of providing five heights. For another example, five positioning holes are defined on the second supporting plate, and the plurality of the adjusting mechanisms each is capable of providing seven heights.

The embodiments of the present disclosure further provide a pet feeder for drinking of the pets, please further refer to FIG. 1, the pet feeder 1 for drinking of the pets includes a base 2 and a storage device 5. The base 2 may be the base 2 in any one of the foregoing embodiments, and the structure of the base 2 may refer to the base 2 of any one of the foregoing embodiments, and details are not described herein again. The storage device 5 is disposed on the first side 21 of the base 2, and the storage device 5 is configured to store the water.

The first side 21 of the base 2 may be configured as a structure for containing the water, or may be configured as a structure for containing both the food and the water.

Figure 10:
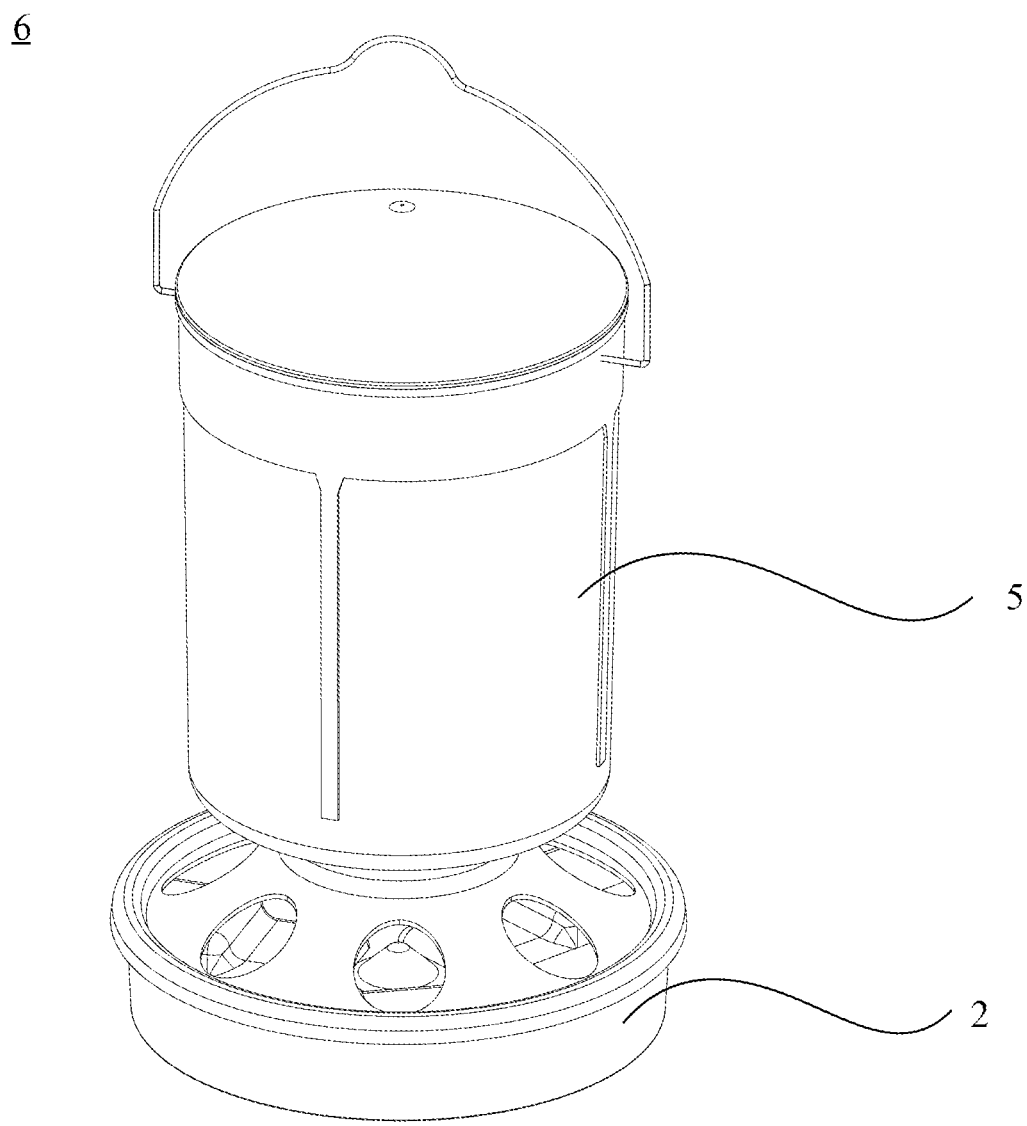
FIG. 10 is a structural schematic diagram of a pet feeder for eating of the pets according to one embodiment of the present disclosure.

The embodiments of the present disclosure further provide a pet feeder for eating of the pets, please further refer to FIG. 10, the pet feeder 6 for eating of the pets includes a base 2 and a storage device 5. The base 2 may be the base 2 in any one of the foregoing embodiments, and the structure of the base 2 may refer to the base 2 of any one of the foregoing embodiments, and details are not described herein again. The storage device 5 is disposed on the first side 21 of the base 2, and the storage device 5 is configured to store the water.

The first side 21 of the base 2 may be configured as a structure for containing the water, or may be configured as a structure for containing both the food and the water.

In the embodiments of the present disclosure and the related technical features, the embodiments and related technical features may be combined and replaced with each other without conflict.

In the description of the present disclosure, the terms "first" and "second" are only used for descriptive purposes, and cannot be understood as indicating or implying relative importance or implicitly indicating the number of indicated technical features. Therefore, features defined with "first" and "second" may explicitly or implicitly include one or more features. In the description of the present disclosure, the meaning of "a plurality of" is two or more, unless specifically defined otherwise.

The base for pet feeder provided by the embodiments of the present disclosure is described in detail, and specific examples are used herein to describe the principles and embodiments of the present disclosure, and the description of the above embodiments is merely used to help understand the method of the present disclosure and the core idea thereof, meanwhile, for a person who skilled in the art, according to the idea of the present disclosure, in a specific implementation manner and an application range, the content should be changed. In summary, the content of the present specification should not be construed as a limitation to the present disclosure.

What is claimed is:

1. A base for pet feeder, comprising:
a main body portion; and
a plurality of adjusting mechanisms;
wherein the main body portion comprises a first side and a second side, the second side is disposed opposite to the first side, and the first side is configured to contain food or water; the plurality of the adjusting mechanisms are disposed at the second side of the main body portion at intervals, each of the plurality of the adjusting mechanisms is capable of providing at least three heights; each of the plurality of the adjusting mechanisms comprises a first supporting plate and a second supporting plate; the first supporting plate comprises a first part and a second part, the first part is rotatably connected to the second side, so as to fold or unfold the first supporting plate with respect to the second side; the second supporting plate is movably connected to the second part, and the second supporting plate is capable of being at different heights with respect to the first supporting plate; the second supporting plate is rotatably connected to the second part, so as to fold or unfold the second supporting plate with respect to the first supporting plate.

2. The base for pet feeder according to claim 1, wherein the main body portion further comprises a plurality of mounting portions, the plurality of the mounting portions are disposed on the second side, one of the plurality of the adjusting mechanisms is disposed on a respective one of the plurality of the mounting portions; each of the plurality of the mounting portions comprises two limiting plates, the two limiting plates are oppositely disposed, and the first supporting plate is rotatably connected between the two limiting plates; and a first limiting protrusion is protruded from one side of at least one of the two limiting plates toward another one of the two limiting plates, when the first supporting plate is folded with respect to the second side, the first limiting protrusion is capable of abutting against one surface of the first supporting plate distal from the second side, so as to limit the first supporting plate.

3. The base for pet feeder according to claim 2, wherein a second limiting protrusion is protruded from the one side of the at least one of the two limiting plates toward the another one of the two limiting plates, when the first supporting plate is unfolded with respect to the second side, the first supporting plate comprises a side edge facing the second limiting protrusion, and the second limiting protrusion abuts against the side edge, so as to limit the first supporting plate.

4. The base for pet feeder according to claim 2, wherein the main body portion comprises a base plate and a surrounding portion, the surrounding portion is disposed around a periphery of the base plate, the surrounding portion and the base plate oppositely define a first groove and a second groove, and the first groove is configured to contain the food and the water; and each of the two limiting plates is disposed in the second groove, and an end surface of each of the two limiting plates distal from the base plate does not exceed an end surface of the surrounding portion distal from the base plate.

5. The base for pet feeder according to claim 4, wherein when the first supporting plate is folded with respect to the base plate, an end surface of the first supporting plate distal from the base plate does not exceed the end surface of the surrounding portion distal from the base plate.

6. The base for pet feeder according to claim 1, wherein the first supporting plate further comprises a first supporting sloping edge, and the first supporting sloping edge is disposed at an edge of the second part distal from the first part; when the first supporting plate is folded with respect to the second side, the first supporting sloping edge is slopingly disposed from the second part toward a direction distal from both the first part and the first side.

7. The base for pet feeder according to claim 6, wherein the second supporting plate comprises a straight portion and a second supporting sloping edge, a first end of the straight portion is connected to the first supporting plate, and a second end of the straight portion is connected to the second supporting sloping edge; when the first supporting plate is unfolded with respect to the second supporting plate, a sloping direction of the second supporting sloping edge is the same as a sloping direction of the first supporting plate.

8. The base for pet feeder according to claim 1, wherein an accommodation groove is defined in the first supporting plate, when the second supporting plate is folded with respect to the first supporting plate, the second supporting plate is accommodated in the accommodation groove.

9. The base for pet feeder according to claim 1, wherein the second supporting plate is slidably connected to the first supporting plate, and the second supporting plate is capable of being limited at different positions of the first supporting plate.

10. The base for pet feeder according to claim 9, wherein the second part is of a hollow structure and is sleeved on the second supporting plate, one end of the second supporting plate is capable of sliding along a length direction of the second part within the second part.

11. The base for pet feeder according to claim 10, wherein a plurality of positioning holes are defined on the second part along the length direction of the second part, an elastic positioning column is disposed on the first supporting plate, and the elastic positioning column is capable of being limited to any one of the plurality of the positioning holes.

12. The base for pet feeder according to claim 1, wherein the base for the pet feeder further comprises a heater, the heater is disposed at the second side, and the heater is configured to heat the food or the water in the first side.

13. A pet feeder, comprising:
the base for the pet feeder according to claim 1; and
a storage device;
wherein the storage device is disposed at the first side of the main body portion of the base for the pet feeder, and the storage device is configured to store the food.

14. A pet feeder, comprising:
the base for the pet feeder according to claim 1; and
a storage device;
wherein the storage device is disposed at the first side of the main body portion of the base for the pet feeder, and the storage device is configured to store the water.

* * * * *